(12) United States Patent
Sun et al.

(10) Patent No.: US 11,811,452 B2
(45) Date of Patent: Nov. 7, 2023

(54) OPTICAL FIBER SYMBOL FORMAT CONVERSION SYSTEM AND METHOD

(71) Applicant: WINGCOMM Co. Ltd., Nantong (CN)

(72) Inventors: Shuang Sun, Shanghai (CN); Zuodong Wang, Beijing (CN); Wei Mao, Palo Alto, CA (US); Yun Bai, Beijing (CN)

(73) Assignee: WINGCOMM Co. Ltd., Nantong (CN)

( * ) Notice: Subject to any disclaimer, the term of this patent is extended or adjusted under 35 U.S.C. 154(b) by 42 days.

(21) Appl. No.: 17/508,878

(22) Filed: Oct. 22, 2021

(65) Prior Publication Data

US 2022/0321218 A1 Oct. 6, 2022

(30) Foreign Application Priority Data

Mar. 31, 2021 (CN) .......................... 202110347221.6

(51) Int. Cl.
*H04B 10/25* (2013.01)
*H04B 10/50* (2013.01)
*H04B 10/516* (2013.01)
*H04B 10/66* (2013.01)

(52) U.S. Cl.
CPC ........... *H04B 10/25* (2013.01); *H04B 10/505* (2013.01); *H04B 10/5161* (2013.01); *H04B 10/66* (2013.01)

(58) Field of Classification Search
CPC ... H04B 10/5161; H04B 10/54; H04B 10/541
See application file for complete search history.

(56) References Cited

U.S. PATENT DOCUMENTS

| | | | | |
|---|---|---|---|---|
| 2004/0258145 A1* | 12/2004 | Popescu | ................. | H03H 15/00 375/232 |
| 2011/0318004 A1* | 12/2011 | Bruno | ................. | H04J 14/0267 398/45 |
| 2016/0006596 A1* | 1/2016 | Dickson | ................ | H04L 27/364 375/298 |
| 2017/0063466 A1* | 3/2017 | Wang | ................... | H04B 10/564 |
| 2019/0199439 A1* | 6/2019 | Zuo | .......................... | H04L 27/26 |

* cited by examiner

*Primary Examiner* — Nathan M Cors
(74) *Attorney, Agent, or Firm* — David R. Stevens; Stevens Law Group

(57) ABSTRACT

Optical fiber interconnection systems and methods are described. One aspect includes receiving a pulse-amplitude modulated (PAM4) electrical signal at a transmitter for transmission to a receiver. The PAM4 electrical signal is decoded into a pair of non-return-to-zero (NRZ) electrical signals. The pair of NRZ electrical signals is converted into a corresponding pair of NRZ optical signals including a first NRZ optical signal and a second NRZ optical signal. The first NRZ optical signal is transmitted to a receiver over an communication channel. The second NRZ optical signal is transmitted to the receiver over the optical communication channel.

21 Claims, 9 Drawing Sheets

OPTICAL FIBER SYMBOL FORMAT CONVERSION SYSTEM AND METHOD

CROSS-REFERENCE TO RELATED APPLICATION

This application claims the benefit of Chinese Application Serial No. 202110347221.6, filed Mar. 31, 2021, which is hereby incorporated herein by reference in its entirety.

BACKGROUND

Technical Field

The present disclosure relates to systems and methods that implement signal communication using optical fiber interconnectivity.

Background Art

With the rise of 5G, big data, distributed storage, AI and high-speed computing services, the scale of data centers is growing by the day. The capability of switching systems associated with data centers has been steadily increasing over time. Increasing data rates and switching speeds give rise to certain challenges that can bottleneck system performance: the modulation bandwidth limitation of the transceiver, and signal degradation due to nonlinear effects in the process of modulation and demodulation.

SUMMARY

Aspects of the invention are directed to systems and methods for an optical fiber interconnect system to support the need for higher communication data rates. One aspect includes receiving a PAM4 electrical signal at a transmitter for transmission to a receiver. The PAM4 electrical signal may be decoded into a pair of non-return to zero (NRZ) electrical signals. The pair of NRZ electrical signals may be converted into a corresponding pair of NRZ optical signals including a first NRZ optical signal and a second NRZ optical signal. The first NRZ optical signal may be transmitted to a receiver over an optical communication channel, and the second NRZ optical signal may be transmitted to the receiver over the optical communication channel.

One aspect includes receiving a first NRZ optical signal over an optical communication channel, and receiving a second NRZ optical signal over the optical communication channel. A pair of NRZ optical signals comprising the first NRZ optical signal and the second NRZ optical signal is converted into a corresponding pair of NRZ electrical signals. The pair of NRZ electrical signals is encoded into a PAM4 electrical signal.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
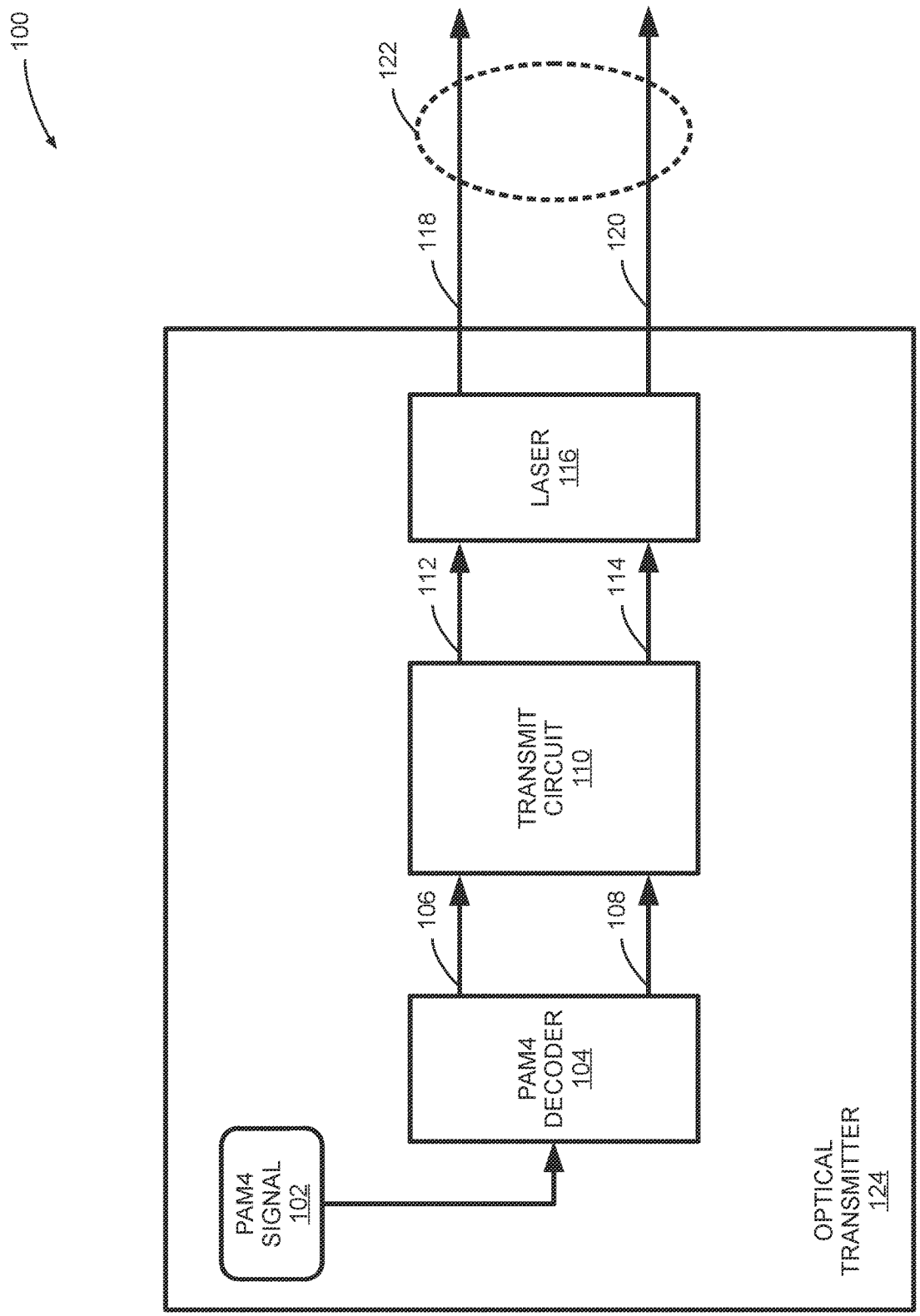
FIG. 1 is a block diagram depicting an embodiment of an optical transmitter interface.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The capability of switching systems associated with data centers has increased from, for example, 10GE/40GE to 100GE/400GE, and server access capabilities have also increased from, for example, 10GE to 25GE/100GE. Based on trends of increased throughput and higher bandwidth, existing interfaces are evolving. For example, the existing 100GE QSFP28 interface is evolving to the next 100GE interface, which is composed of two 50GE physical interfaces. Compared with the previous 100GE QSFP28 interface, the number of channels is halved and the port density is doubled. With respect to presentation, there are two packaging forms of the next generation 100GE interface: Small Form-Factor Pluggable-Double Density (SFP-DD) and Double Small Form-Factor Pluggable (DSFP).

The SFP-DD electrical interface can expand on the existing SFP interface. The SFP-DD interface is similar to the existing SFP interface; with the SFP-DD interface adding a row of electrical interfaces to the existing SFP interface. The SFP-DD interface was proposed by the Small Form-Factor Pluggable-Double Density (SFP-DD) Multi-Source Agreement (MSA) Working Group. The existing SFP single channel interface is widely used in non-return-to-zero (NRZ) signal communication with a 28 Gbps data rate, or pulse-amplitude modulation 4-level (PAM4) signal communication with a 56 Gbps data rate. The new SFP-DD interface can support two channels, and each channel can support 28 Gbps NRZ or 56 Gbps (PAM4), so that the two channels can reach 56 Gbps (NRZ) or 112 Gbps (PAM4) aggregate bandwidth. SFP-DD doubles the density and speed of communication channels. At the same time, backwards compatibility with respect to the SFP interface is helpful to meet the requirements of data bandwidth, channel density and interface compatibility for the next generation data center interconnection.

In a DSFP connector assembly, the upper row pins and the lower row pins are respectively provided with preset pins, and two channels are added. Users can define the preset pins according to their needs, thus expanding their use functions. DSFP is a packaging type initiated and pushed by individual equipment manufacturers, which cancels many control and indication pins, and uses software to read and write registers for communication and control.

Active optical cable (AOC) is a version of an Active Optical Fiber, which is mainly used in short-distance multi-channel data applications. An active optical cable consists of one or more multimode optical fibers, an optical transceiver control chip, an optical device, and an optical module. Transceivers on both sides of the active optical cable provide capabilities of photoelectric conversion, optical transmission and driving electrical ports, so as to improve the transmission speed and distance of optical signals while maintaining compatibility with the performance of associated electrical port specifications.

In terms of transmission form, in order to meet the application requirements of the next generation data center interconnection, several flexible and low-cost 100 Gbit/s rate transmission schemes have been proposed. The mainstream transmission mode of 2 channels×50 Gbit/s modulated by PAM4 can reduce the design complexity, area and power consumption a of transceiver module. However, there are two problems which are the bottleneck of system performance: the modulation bandwidth limitation of the transceiver, and signal degradation due to nonlinear effects in the process of modulation and demodulation. To solve these two problems, a scheme based on DSP (Digital Signal Processing) has been proposed. The DSP scheme uses decision feedback equalization (DFE) and forward equalization (FFE) to compensate the nonlinear distortion of the channel. However, these DSP-based schemes often require high computational complexity and consume a lot of power.

Aspects of the invention are configured to provide an optical fiber interconnection system comprising an electrical interface, an optical path interface (i.e., an optical transceiver), and a gearbox. In one aspect, one or more electrical interface signals processed by the system are N/2 paths of PAM4 signals, and optical interface signals are N paths of NRZ signals, N being an even number greater than or equal to 2.

Some embodiments implement communication between different components using one or more optical communication links (channels). In an aspect, these optical communication links are implemented using one or more optical fibers. An optical fiber may be used to implement a full-duplex optical communication link (channel), a half-duplex optical communication link (channel), or a simplex optical communication link (channel).

FIG. 1 is a block diagram depicting an embodiment of an optical transmitter interface 100. As depicted, optical transmitter interface 100 includes an optical transmitter 124 optically connected to an optical communication channel 122. Optical communication channel 122 may be comprised of one or more optical fibers that implement a simplex optical communication link. Optical transmitter 124 may further include a PAM4 decoder 104, a transmit circuit 110, and a laser 116.

In an aspect, PAM4 decoder 104 receives a PAM4 signal 102. PAM4 signal 102 may be an electrical PAM4 signal. PAM4 decoder 104 can be configured to convert (i.e., decode) PAM4 signal 102 into a pair of NRZ electrical signals—an NRZ electrical signal 106 and an NRZ electrical signal 108. Transmit circuit 110 receives NRZ electrical signal 106 and NRZ electrical signal 108, processes these signals, and outputs a processed NRZ electrical signal 112 and a processed NRZ electrical signal 114.

In an aspect, processed NRZ electrical signal 112 and processed NRZ electrical signal 114 are received by laser 116. Laser 116 may include one or more vertical-cavity-surface-emitting-lasers (VCSELs). Each of processed NRZ electrical signal 112 and processed NRZ electrical signal 114 may be converted by a VCSEL associated with laser 116, to an NRZ optical signal 118, and an NRZ optical signal 120, respectively. NRZ optical signal 118 and NRZ optical signal 120 are transmitted over optical communication channel 122.

Figure 2:
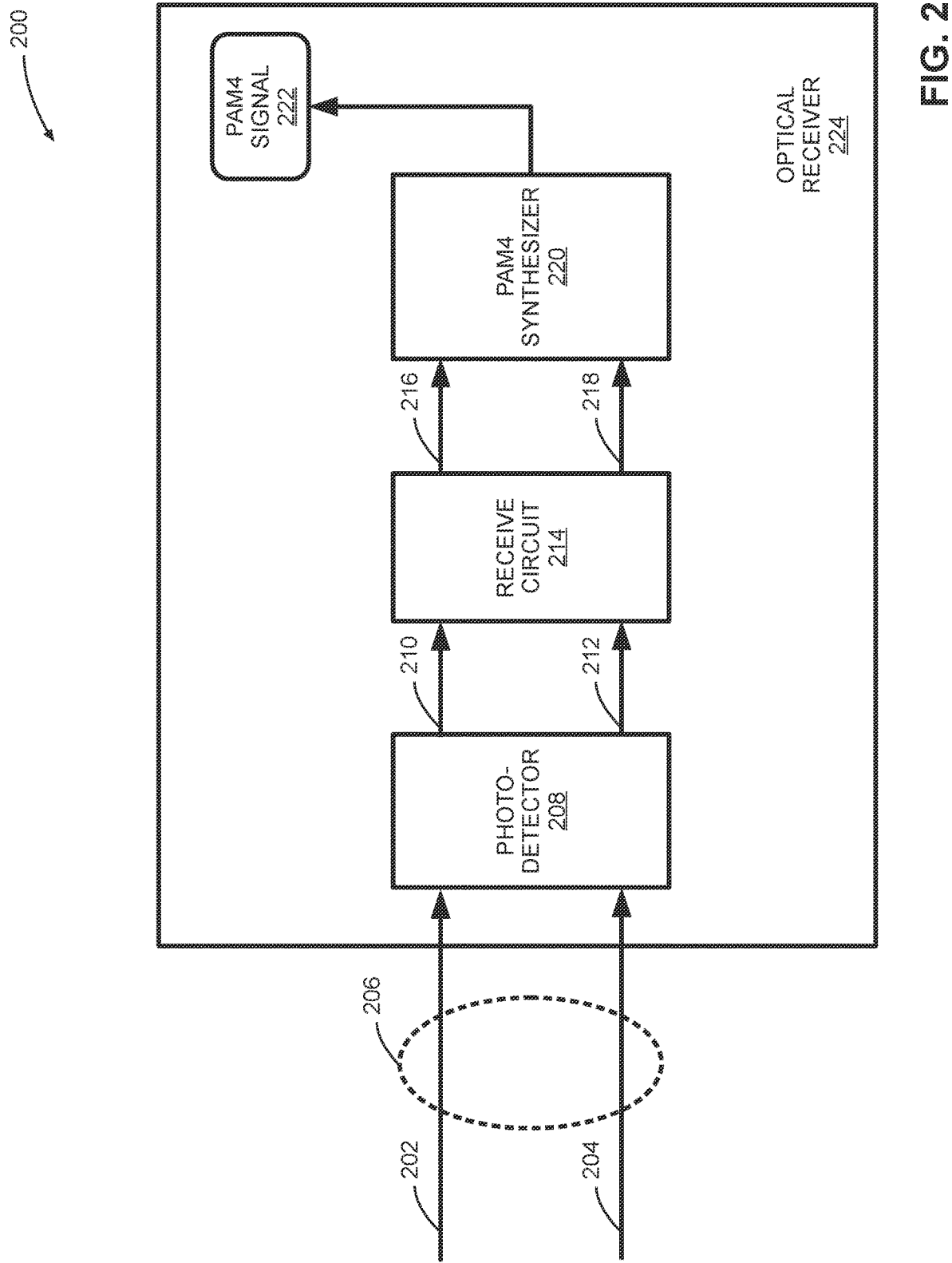
FIG. 2 is a block diagram depicting an embodiment of an optical receiver interface.

FIG. 2 is a block diagram depicting an embodiment of an optical receiver interface 200. As depicted, optical receiver interface 200 includes an optical receiver 224 optically connected to an optical communication channel 206. Optical communication channel 206 may be comprised of one or more optical fibers that implement a simplex optical communication link. Optical receiver 224 may further include a PAM4 synthesizer 220, a receive circuit 214, and a photodetector 208.

In an aspect, optical receiver 224 receives an NRZ optical signal 202 and an NRZ optical signal 204 over optical communication channel 206. In an aspect, NRZ optical signal 202 and NRZ optical signal 204 are identical to NRZ optical signal 118 and NRZ optical signal 120, respectively. Optical communication channel 206 may be identical to optical communication channel 122. Photodetector 208 converts NRZ optical signal 202 and NRZ optical signal 204 to an NRZ electrical signal 210, and an NRZ electrical signal 212, respectively. Receive circuit may process NRZ electrical signal 210, and NRZ electrical signal 212 to generate a received NRZ electrical signal 216, and a received NRZ electrical signal 218, respectively. PAM4 synthesizer 220 may combine (i.e., encode) received NRZ electrical signal 216, and received NRZ electrical signal 218 to generate a PAM4 signal 222. In an aspect, PAM4 signal 222 is an electrical PAM4 signal, and is substantially identical to PAM4 signal 102.

A combination of optical transmitter 124 and optical receiver 224 optically connected by optical communication channel 122/206 may function as an optical communication system for PAM4 signals, where each PAM4 signal is converted into a pair of NRZ optical signals 118/202 and 120/204 by optical transmitter 124, and transmitted to optical receiver 224. Optical receiver 224 may receive NRZ optical signals 118/202 and 120/204, and combine these signals to generate PAM4 signal 222.

In an aspect, an array of optical communication systems that are each a combination of optical transmitter 124 and optical receiver 224 optically connected by optical communication channel 122/206 may be configured to realize a high-performance optical communication system is as follows: N/2 (e.g., wherein N is an even number greater than or equal to 2) PAM4 signals are first converted into N NRZ electrical signals by one or more PAM4 decoders (e.g., PAM4 decoder 104), and then converted into N NRZ optical signals (e.g., NRZ optical signals 118 and 120) by one or more transmitters (e.g. transmit circuit 110) and lasers (e.g., laser 116). The N NRZ optical signals are converted into N electrical NRZ signals by one or more photodetectors (e.g., photodetector 208) and receivers (e.g., receive circuit 214), and N/2PAM4 signals are output by one or more PAM4 synthesizers (e.g., PAM4 synthesizer 220).

Compared with a traditional PAM4 receiver, the sensitivity and performance of an optical communication system that is a combination of optical transmitter 124 and optical receiver 224 optically connected by optical communication channel 122/206 system are significantly improved because the optical signals are NRZ signals. For example, in an optical transceiver with a 50G PAM4 interface, the electrical signal can be 50G PAM4 and the optical signals can be 50G PAM4. On the other hand, an electrical signal of an optical communication system comprising one or more embodiments of optical transmitter 124 and/or optical receiver 224 (e.g., optically connected by optical communication channel 122/206) is 50G PAM4 and the optical signal is 25G NRZ. After passing through the photodetector(s), the amplitude of the associated electric eye is up to three times that of PAM4, and the width of the electric eye is also improved relative to that of PAM4. Compared with 50G PAM4, the sensitivity of 25G NRZ after passing through the receiver is about 6 dB higher. Therefore, an optical communication system that is a combination of optical transmitter 124 and optical receiver 224 optically connected by optical communication channel 122/206 has higher performance than a system that implements traditional PAM4 signaling.

Figure 3:
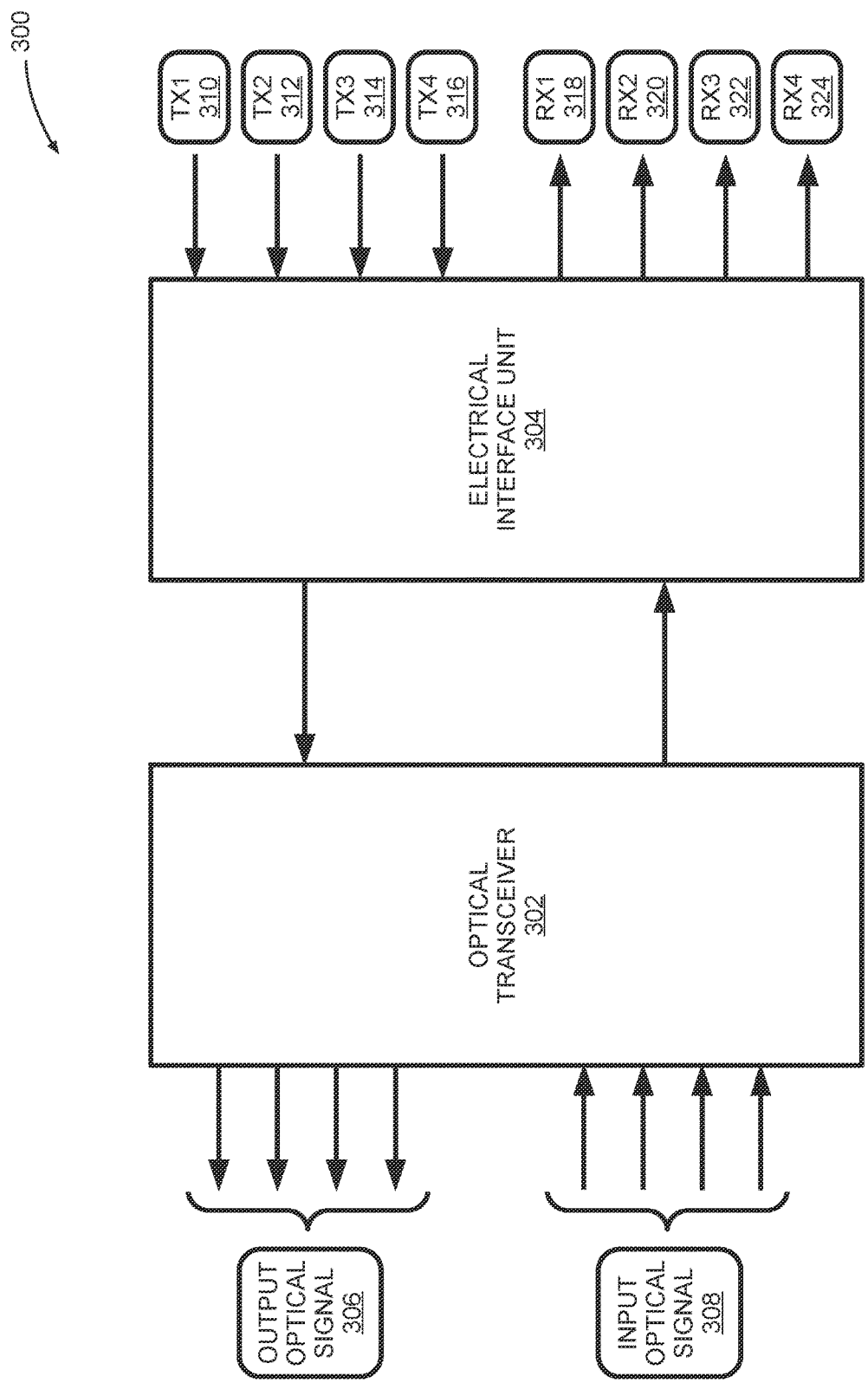
FIG. 3 is a block diagram depicting an embodiment of an optical fiber interconnection interface.

FIG. 3 is a block diagram depicting an embodiment of an optical fiber interconnection interface 300. As depicted, optical fiber interconnection interface 300 includes an optical transceiver 302, and an electrical interface unit 304. Electrical interface unit 304 may be configured to interface with a computing system such as a computer server or a network router, and transmit and receive one or more electrical signals to and from the computing system, respectively.

In one aspect, electrical interface 304 is configured to receive a TX1 signal 310, a TX2 signal 312, a TX3 signal 314, and a TX4 signal 316 from the computing system. Each of TX1 signal 310 through TX4 signal 316 may be a PAM4 electrical signal or an NRZ electrical signal. Electrical interface 304 may transmit each of TX1 signal 310 through TX4 signal 316 to optical transceiver 302. Optical transceiver 302 may convert each of TX1 signal 310 through TX4 signal 316 to an optical signal (using, for example, one or more VCSELs), and collectively transmit these optical signals as an output optical signal 306 over a transmit optical communication channel that may be comprised of one or more optical fibers. In an aspect, optical signal 306 may be comprised of one or more PAM4 or NRZ optical signals.

In one aspect, optical transceiver 302 may receive an input optical signal 308 over a receive optical communication channel that may be comprised of one or more optical fibers. In an aspect, optical signal 306 may be comprised of one or more PAM4 or NRZ optical signals. Optical transceiver 302 may convert the PAM4 or NRZ optical signals into electrical signals using, for example, one or more photodetectors. These electrical signals are received by electrical interface unit 304, and then transmitted to the computing system as an electrical signal RX1 318, an electrical signal RX2 320, an electrical signal RX3 322, and an electrical signal RX4 324. In an aspect, each of signal RX1 318 through RX4 324 is a PAM4 or NRZ electrical signal.

In general, optical fiber interconnection interface 300 transmits and receives PAM4 or NRZ signals directly, without any PAM4 to NRZ signal conversion, or vice versa. In an aspect, optical fiber interconnection interface 300 is an 100G SFP interface optical communication scheme. Electrical interface unit 304 may be a 100G SFP electrical interface unit, and optical transceiver 302 may be a 100G NRZ optical transmitting and receiving unit. The input signals to electrical interface unit 304 may be four channels of 25G NRZ signals TX1 signal 310 through TX4 signal 316. Electrical interface unit 304 may output four channels of 25G NRZ signals RX1 318 through RX4 324. Input signals TX1 signal 310 through TX4 signal 316 may be converted into optical signals by an NRZ optical transmitting unit that may be a component of optical transceiver 302. The received optical signals are transmitted to the SFP electrical interfaces (i.e., to electrical interface unit 304) as signals RX1 318 through RX4 324 through an NRZ receiving unit that may be a component of optical transceiver 302.

Figure 4:
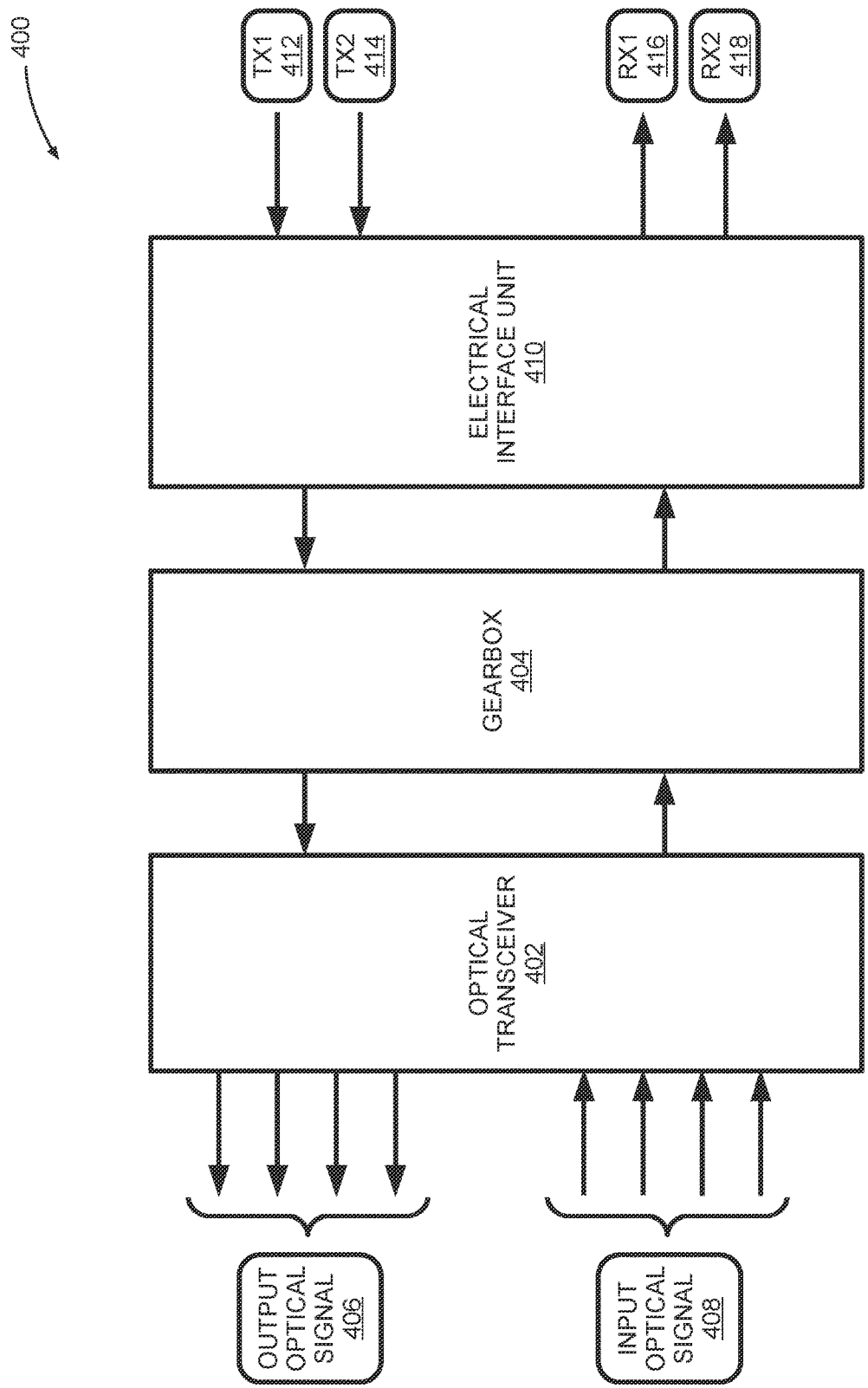
FIG. 4 is a block diagram depicting a embodiment of an optical fiber interconnection interface.

FIG. 4 is a block diagram depicting a embodiment of an optical fiber interconnection interface 400. As depicted, optical fiber interconnection interface 400 includes an optical transceiver 402, a gearbox 404, and an electrical interface unit 410. Electrical interface unit 410 may be configured to interface with a computing system such as a computer server or a network router, and transmit and receive one or more electrical signals to and from the computing system, respectively.

In one aspect, electrical interface 410 is configured to receive a TX1 signal 412, and a TX2 signal 414 from the computing system. Each of TX1 signal 412 and TX2 signal 414 may be a PAM4 electrical signal. Electrical interface 410 may transmit each of TX1 signal 412 and TX2 signal 414 to gearbox 404. Gearbox 404 may convert each of TX1 signal 412 and TX2 signal 414 to a pair of NRZ electrical signals. These two pairs of NRZ electrical signals are transmitted by gearbox 404 to optical transceiver 302. Optical transceiver 402 may convert each pair of NRZ electrical signals to a corresponding pair of NRZ optical signals (using, for example, one or more VCSELs), and collectively transmit these optical signals as an output optical signal 406 over a transmit optical communication channel that may be comprised of one or more optical fibers.

In one aspect, optical transceiver 402 may receive an input optical signal 408 over a receive optical communication channel that may be comprised of one or more optical fibers. In an aspect, optical signal 408 may be comprised of two pairs of NRZ optical signals. Optical transceiver 402 may convert the two pairs of NRZ optical signals into two corresponding pairs of NRZ electrical signals using, for example, one or more photodetectors. These NRZ electrical signals are transmitted to gearbox 404 that converts each pair of NRZ electrical signals to a corresponding PAM4 electrical signal. Gearbox 404 may transmit these two PAM4 electrical signals to electrical interface unit 410, which transmits these signals to the computing system as an electrical signal RX1 416, and an electrical signal RX2 418. In an aspect, each of signal RX1 416 and RX2 418 is a PAM4 electrical signal.

In general, optical fiber interconnection interface 400 may be implemented as a 100G DSFP interface or SFP-DD interface. Electrical interface unit 410 may be implemented as a 100G DSFP or SFP-DD PAM4 electrical interface unit. Optical transceiver 402 may be implemented as a 100G NRZ optical transmitting and receiving unit. In one aspect, electrical interface unit is 410 a next-generation 100G DSFP or SFP-DD interface. The input electrical port signals (i.e., electrical signals TX1 412 and TX2 414) are each a 50G PAM4 signal. The output electrical port signals (i.e., electrical signals RX1 416 and RX2 418) are each a 50G PAM4 signal. The input electrical signals TX1 412 and TX2 414 are converted into NRZ signals after being processed by gearbox 404, and then converted into output optical signal 406 by optical transceiver 402. Input optical signal 408 is amplified by optical transceiver 402 and transmitted to gearbox 404, which generates DSFP or SFP-DD electrical interface signals RX1 416 and RX2 418.

Figure 5:
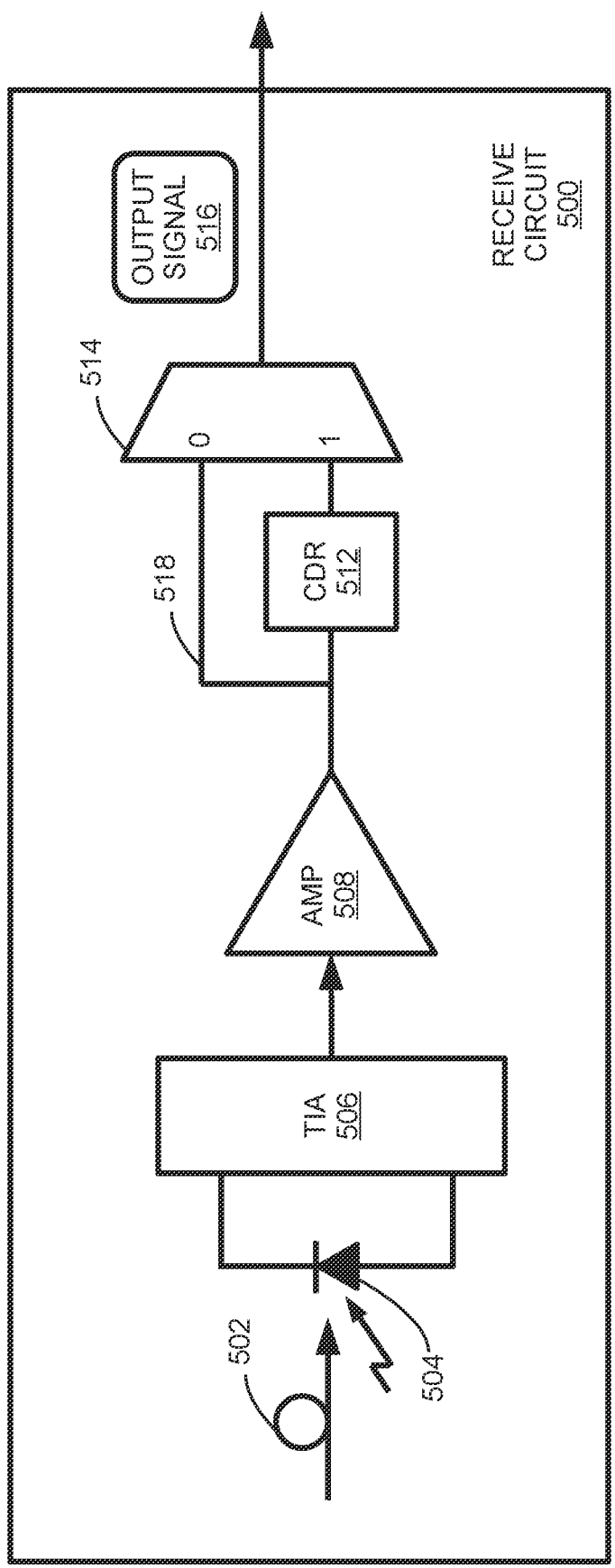
FIG. 5 is a circuit diagram depicting a embodiment of a receive circuit.

FIG. 5 is a circuit diagram depicting a embodiment of a receive circuit 500. As depicted, receive circuit 500 includes a photodetector 504, a transimpedance amplifier TIA 506, an amplifier AMP 508, a clock/data recovery module CDR 512, and a multiplexer 514.

In an aspect, receive circuit 500 receives an optical signal 502. Optical signal 502 may be received over an optical communication channel (e.g., optical communication channel 206). Photodetector 504 can convert optical signal 502 to an electrical signal. This electrical signal is amplified by transimpedance amplifier 506 that provides a current to voltage conversion for the electrical signal, and then by AMP 508. An output of AMP 508 may be referred to as a received NRZ electrical signal (e.g., received NRZ electrical signal 216, and received NRZ electrical signal 218). Receive circuit 500 outputs an output signal 516.

In an aspect, receive circuit 500 can operate in either a CDR bypass mode or a CDR mode, respectively, where CDR stands for "clock/data recovery." Switching between these two modes is enabled by multiplexer 514. When a 1 is selected on multiplexer 514, receive circuit is in CDR mode. In this case, optical signal 502 is an NRZ optical signal, and TIA 506 outputs an NRZ electrical signal. The output of AMP 508 may be received by CDR 512, and output through multiplexer 514 as output signal 516. In this case, output signal 516 is a CDR retimed electrical signal.

CDR 512 may be configured to perform clock and/or data recovery on an NRZ electrical signal. CDR 512 may be used to recover high quality and low jitter data from channel distortion and noise. In one aspect, CDR 512 is composed of a phase comparator, a loop filter and a VCO clock generator. When used for low-speed data input, CDR 512 can be bypassed by using multiplexer 514.

When a 0 is selected on multiplexer 514, receive circuit is in CDR bypass mode. In this case, optical signal 502 is an NRZ optical component of a PAM4 signal, and TIA 506 outputs an associated NRZ electrical signal. The output of AMP 508 may bypass CDR 512 as a bypass signal 518, and be output through multiplexer 514 as output signal 516. In this case, output signal 516 is a CDR bypassed electrical signal.

Figure 6:
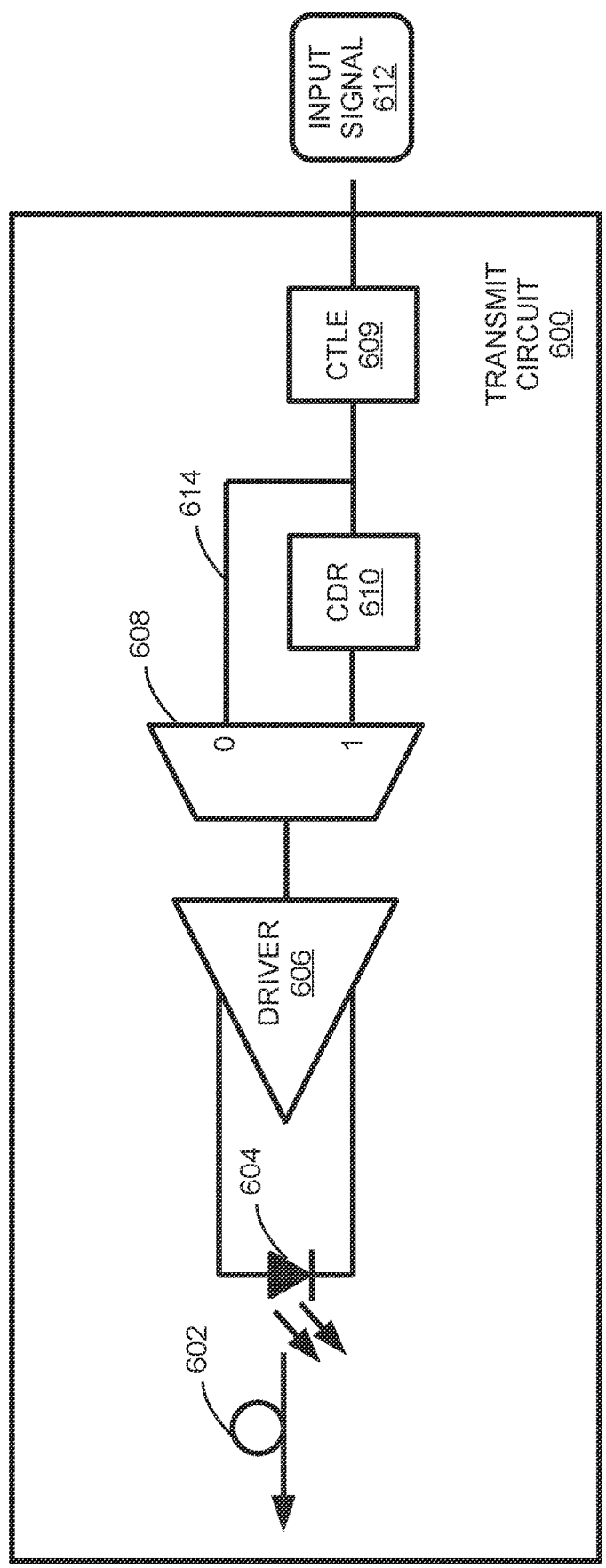
FIG. 6 is a circuit diagram depicting an embodiment of a transmit circuit.

FIG. 6 is a circuit diagram depicting an embodiment of a transmit circuit 600. As depicted, transmit circuit 600 includes a VCSEL 604, a driver 606, a multiplexer 608, a continuous-time linear equalizer CTLE 609, and a clock/data recovery module CDR 610. Transmit circuit 600 may receive an input (electrical) signal 612.

In an aspect, transmit circuit 600 can operate in either a CDR bypass mode or an CDR retimed mode. Switching between these two modes is enabled by multiplexer 608. When a 1 is selected on multiplexer 608, receive circuit is in CDR retimed mode. In this case, input signal 612 is an NRZ electrical signal. This NRZ electrical signal is received by CTLE 609. CTLE 609 performs an equalization function in continuous-time on the input signal. For example, CTLE 609 may perform an equalization function to compensate for communication channel effects caused due to an associated optical communication channel.

An output of CTLE 609 may be transmitted to CDR 610. CDR 610 may be configured to perform clock and/or data recovery on the NRZ electrical signal. An output of CDR 610 may be output to multiplexer 608.

CDR 610 may be configured to perform clock and/or data recovery on an NRZ electrical signal. CDR 610 may be used to recover high quality and low jitter data from channel distortion and noise. In one aspect, CDR 610 is composed of a phase comparator, a loop filter and a VCO clock generator. When used for low-speed data input, CDR can be bypassed by using multiplexer 608.

When a 0 is selected on multiplexer 514, receive circuit is in CDR bypass mode. In this case, input signal 612 is an NRZ electrical component of a PAM4 electrical signal. This signal may bypass CDR 610 as a bypass signal 614, and be transmitted directly to multiplexer 608.

An output of multiplexer 608 is amplified by driver 606, and output as an amplified electrical signal to VCSEL 604. An output of driver 606 may be referred to as a processed NRZ electrical signal (e.g., processed NRZ electrical signal 112 and processed NRZ electrical signal 114). VCSEL 604 converts the amplified electrical signal to an NRZ optical signal 602, and transmits optical signal 602 over an optical communication channel (e.g., optical communication channel 122).

Figure 7:
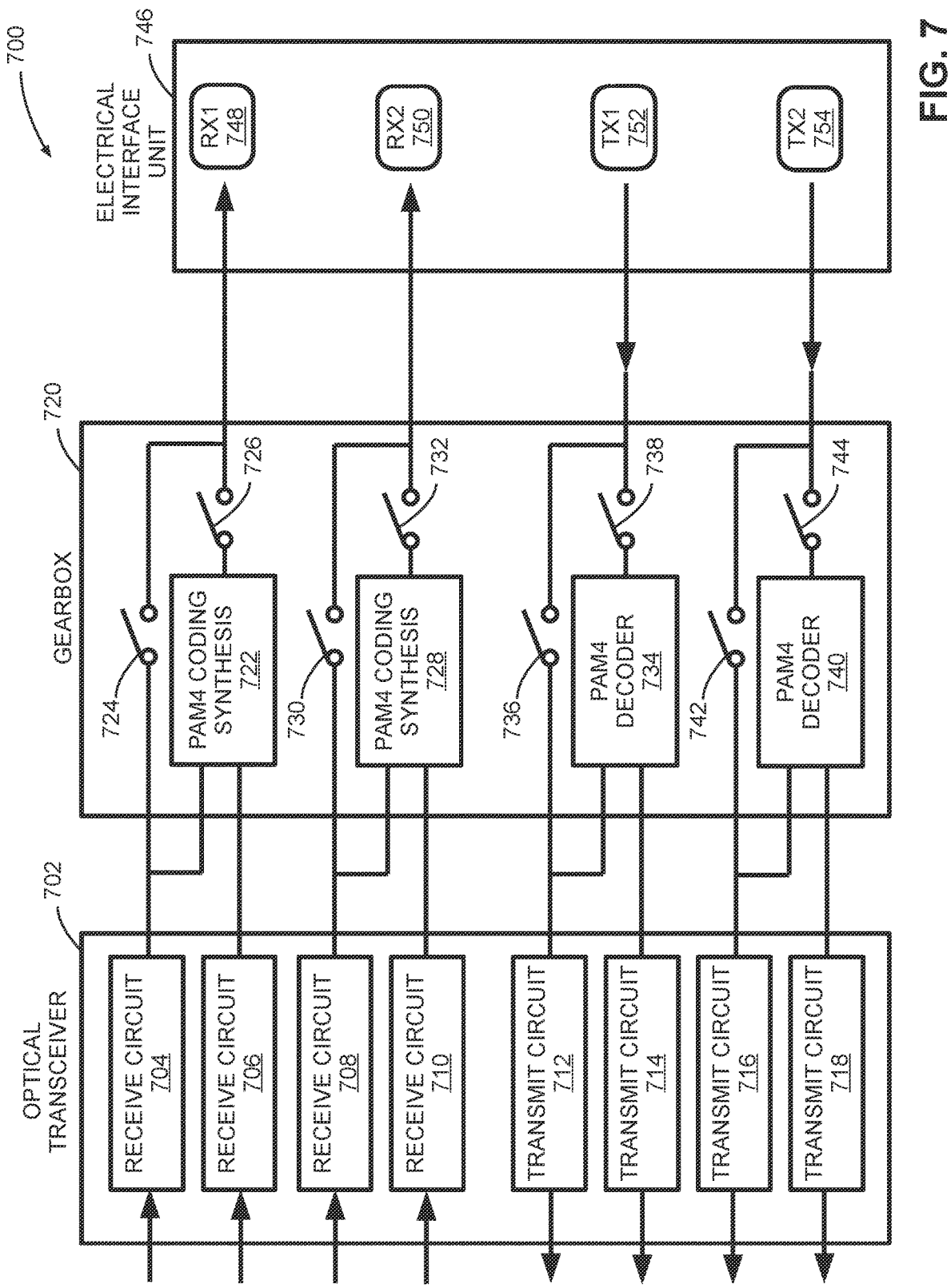
FIG. 7 is a block diagram depicting an embodiment of an optical fiber interconnection system.

FIG. 7 is a block diagram depicting an embodiment of an optical fiber interconnection system 700. As depicted, optical fiber interconnection system 700 includes an optical transceiver 702, a gearbox 720, and an electrical interface unit 746. Optical transceiver 702 may further include a receive circuit 704, a receive circuit 706, a receive circuit 708, a receive circuit 710, a transmit circuit 712, a transmit circuit 714, a transmit circuit 716, and a transmit circuit 718. Gearbox 720 may further include a PAM4 coding synthesis 722, a PAM4 coding synthesis 728, a PAM4 decoder 734, a PAM4 decoder 740, and switches 724, 726, 730, 732, 736, 738, 742, and 744.

In an aspect, optical transceiver 702 functions similar to optical transceiver 402, gearbox 720 functions similar to gearbox 404, and electrical interface unit 746 functions similar to electrical interface unit 410.

In an aspect, each of receive circuit 704 through 710 is similar to receive circuit 500; each of transmit circuit 712 through 718 is similar to transmit circuit 600. In one aspect, optical fiber interconnection system 700 may operate in either an NRZ signal transmit/receive mode, or a PAM4 signal transmit/receive mode. In one aspect, each of receive circuits 704 through 710 operates in either a CDR mode or a CDR bypass mode. Switching between a PAM4 transmit/receive mode and an NRZ transmit/receive mode may be implemented by appropriate switch settings of switches 724, 726, 730, 732, 736, 738, 742, and 744.

In a PAM4 (signal) receive mode, receive circuit 704 through 710 may each receive an NRZ optical signal. For example, receive circuit 704 through 710 may collectively receive input optical signal 408 that is comprised of four NRZ optical signals, with one NRZ optical signal going to each of receive circuit 704 through 710.

In an aspect, in a PAM4 receive mode, switches 726 and 732 are closed, while switches 724 and 730 are open. PAM4 coding synthesis 722 may receive a pair of NRZ electrical signals output from receive circuits 704 and 706, respectively. PAM4 coding synthesis 728 may receive a pair of NRZ electrical signals output from receive circuits 708 and 710, respectively. PAM4 coding synthesis 722 may process the pair of NRZ electrical signals from receive circuits 704 and 706 to generate a PAM4 electrical signal that is output to electrical interface unit 746 as an RX1 signal 748. PAM4 coding synthesis 728 may process the pair of NRZ electrical signals from receive circuits 708 and 710 to generate a PAM4 electrical signal that is output to electrical interface unit 746 as an RX2 signal 750. Essentially, PAM 4 coding synthesis 724 and 728 function similarly to PAM4 synthesizer 220.

In an aspect, in an PAM4 (signal) transmit mode, switches 738 and 744 are closed, while switches 736 and 742 are open. In this case, PAM4 decoder 734 receives a PAM4 electrical signal TX1 752 from electrical interface unit 746, while PAM4 decoder 740 receives a PAM4 electrical signal TX2 754 from electrical interface unit 746. PAM4 decoder 734 converts the received PAM4 electrical signal into a pair of NRZ electrical signals and transmits this pair of NRZ electrical signals to transmit circuit 712 and 714. PAM4 decoder 740 converts the received PAM4 electrical signal into a pair of NRZ electrical signals and transmits this pair of NRZ electrical signals to transmit circuit 716 and 718. Essentially, PAM4 decoder 734 and 740 function similarly to PAM4 decoder 104.

In the PAM4 (signal) transmit mode, each of transmit circuit 712 through 718 may output an NRZ optical signal that may be transmitted over an optical communication channel. Collectively, The four NRZ optical signals output by transmit circuit 712 through 718 may comprise output optical signal 406.

In an NRZ (signal) receive mode, receive circuit 704 and 708 may each receive an NRZ optical signal. For example, receive circuit 704 and 708 may collectively receive input optical signal 408 that is comprised of two NRZ optical signals, with one NRZ optical signal going to each of receive circuit 704 and 708.

In the NRZ receive mode, switches 726 and 732 are open, while switches 724 and 730 are closed. In the NRZ receive mode, receive circuit 706 and 710, and transmit circuit 714 and 718 are not used. Gearbox 720 may be configured to receive an associated NRZ electrical signal from each of receive circuit 704 and 708, and directly route these signals (via closed switches 724 and 730, respectively). These routed signals are received by electrical interface unit 746 as NRZ electrical signals RX1 748 and RX2 750, respectively.

In an NRZ (signal) transmit mode, switches 738 and 744 are open, while switches 736 and 742 are closed. Electrical signals TX1 752 and TX2 754 may be routed directly to transmit circuits 712 and 716, respectively. This routing is accomplished by closed switches 736 and 742. Transmit circuit 714 and 718 may not be used in the NRZ transmit mode. In this manner, transmit circuit 712 and 716 each generates a NRZ optical signal that may be transmitted over an optical communication channel.

In an NRZ transmit mode, each of transmit circuit 712 and 716 outputs an NRZ optical signal as an output signal in the NRZ transmit mode. The two NRZ optical signals output by transmit circuit 712 and 716 may comprise output optical signal 406.

An optical communication system using optical fiber interconnection system 700 can realize the multiplexing of a PAM4 mode and an NRZ mode. Optical fiber interconnection system 700 can support a PAM4 mode or an NRZ mode by switching the switches 724, 726, 730, 732, 736, 738, 742, and 744. Specifically, when switches 726, 732, 738, and 744 are closed and switches 724, 730, 736 and 742 are open, optical fiber interconnection system 700 is in PAM4 mode; when switches 724, 730, 736 and 742 are closed and switches 726, 732, 738, and 744 are open, the electrical port is in NRZ mode. In one aspect, optical fiber interconnection system 700 supports a 100G NRZ signal transmission mode.

By switching multiplexers 514 and/or 608, multiplexing of high-speed mode (100 Gbps) and low-speed mode (10 Gbps) can be realized. In one aspect, CDR 512 and/or CDR 610 include a CDR phase comparator. A CDR phase comparator may be comprised of a nonlinear phase comparator or a linear phase comparator. The CDR clock recovery and bypass data can be selected by a data selector and output to a driver. The driver can be integrated with a pre-emphasis equalizer, which promotes the high-frequency component of the output signal to compensate the attenuation of the optical path. Output electrical signals are converted into optical signals via a VCSEL laser such as VCSEL 604.

In one aspect, optical fiber interconnection system 700 supports receiving 100G NRZ optical signals. a PD photodetector array (e.g., photodetector 504) converts these optical signals into current (electrical) signals, and the small signals are amplified by a TIA transimpedance amplifier (e.g., TIA 506), then the signals are further amplified by a limiting amplifier (e.g., AMP 508), and then input to a CDR clock/data recovery module (e.g., CDR 512).

The CDR clock/data recovery module (e.g., CDR 512 or CDR 610) is used to recover high quality and low jitter data from channel distortion and noise. The CDR clock/data recovery module is composed of a phase comparator, a loop filter and a VCO clock generator. When used for low-speed data input, the CDR clock/data recovery module can be bypassed. By bypassing the data selector, the multiplexing of high-speed mode (100 Gbps) and low-speed mode (10 Gbps) can be realized. The CDR phase comparator is composed of a nonlinear phase comparator or a linear phase comparator. The CDR clock recovery and bypass data can be selected by the data selector and sent to the output stage of the signal transmit chain. The output stage is integrated with a forward feedback equalizer to de-emphasize the signals and to keep the amplitude of the rising edge and falling edge of the signal unchanged. Other temporal or frequency portions of the signals may be attenuated to compensate for the attenuation of the associated electrical signals.

In one aspect, gearbox 720 may include a CTLE continuous-time linear equalization, a potential determiner, and a PAM4 decoder in the signal transmit chain. The PAM4 input signals (e.g., TX1 752 and TX2 754) are compensated for channel attenuation via the CTLE continuous-time linear equalizer. These equalized signals are compared with three reference voltages, which correspond to the middle of the upper, middle and lower eye diagrams of a PAM4 signal. Alternatively, the input PAM4 can be level shifted for decision. Three NRZ signals are obtained after judgment, and two NRZ signals are obtained after decoding the three NRZ signals. As the high significant bit of PAM4, one NRZ signal can be directly obtained from the sliced middle NRZ signal. The other NRZ signal, as the low significant bit of PAM4, needs to be logically obtained by using the sliced three outputs. This logic can be realized by a simple current mode logic (CML) circuit (e.g., PAM4 coding and synthesis 722 and 728, and PAM4 decoders 734 and 740). The transmitter portion of gearbox 720 can also be bypassed using switches 736, 738, 742, and 744. After bypass, a 100G SR2 signal can be used as 50G SR2 signal, and the input is changed from two paths of 25G PAM4 to two paths of 25G NRZ signals.

The receiver portion of gearbox 720 can be configured to combine two NRZ circuits into one PAM4 signal. A PAM4 synthesizer can be realized by a CML circuit, such as PAM4 coding synthesis 722 and 728. In one aspect, one path of NRZ signals can be used as a high significant bit, and the other path of NRZ signals can be used as a low significant bit. Two paths of NRZ are input to the input end of the CML circuit (e.g., PAM4 coding synthesis 722 or 728), and the PAM4 signal can be obtained by weighting the current. A CML adder is also integrated with a forward feedback equalizer FFE to de-emphasize the signals, which keeps the amplitude of a rising edge and a falling edge of the signal unchanged, and attenuates other temporal or frequency portions of the signals to compensate for the attenuation of the associated electrical signals. The receiver portion of gearbox 720 can also be bypassed using switches 724, 726, 730, and 732. After bypass, a 100G SR2 signal can be used as a 50G SR2 signal, and the output is changed from two paths of 25G PAM4 signals to two paths of 25G NRZ signals.

Figure 8:
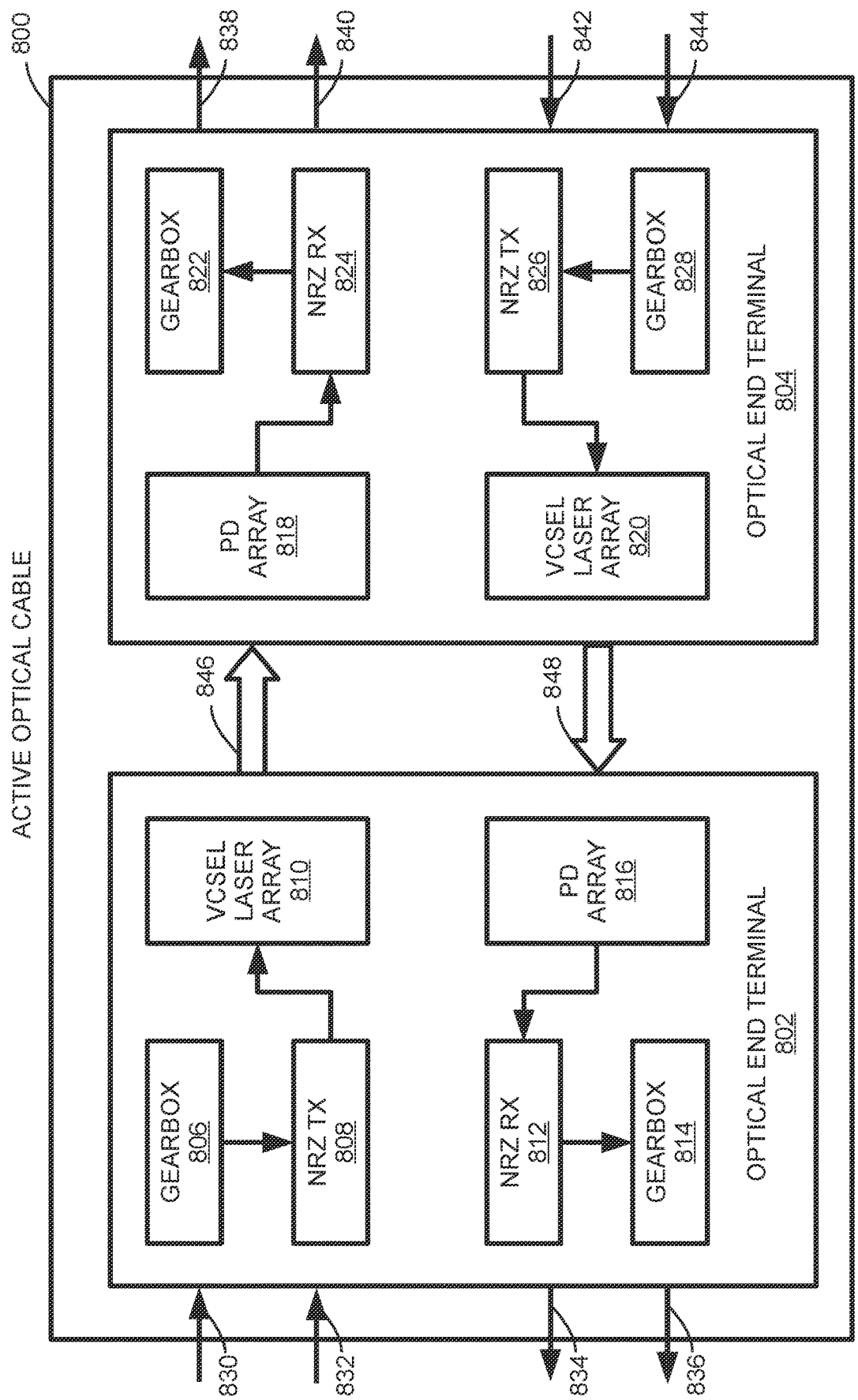
FIG. 8 is a block diagram depicting an embodiment of an active optical cable.

FIG. 8 is a block diagram depicting an embodiment of an active optical cable 800. As depicted, active optical cable 800 includes an optical end terminal 802 and an optical end terminal 804, connected by an optical communication channel 846 and an optical communication channel 848. Optical end terminal 802 further includes a gearbox 806, an NRZ transmitter NRZ TX 808, a VCSEL laser array 810, an NRZ receiver NRZ RX 812, a gearbox 814, and a PD array 816. Optical end terminal 804 further includes a gearbox 828, an NRZ transmitter NRZ TX 826, a VCSEL laser array 820, an NRZ receiver NRZ RX 824, a gearbox 822, and a PD array 818.

In one aspect, optical end terminal 802 receives a PAM4 electrical signal 830 and a PAM4 electrical signal 832 via an electrical interface unit (not depicted in FIG. 8). Gearbox 806 may convert these two PAM4 electrical signals into two pairs of NRZ electrical signals, and transmit these signals to NRZ TX 808. NRZ TX 808 may function similar to transmit circuit 600, and may output one or more conditioned NRZ electrical signals to VCSEL laser array 810 that converts the NRZ electrical signals to NRZ optical signals. These NRZ optical signals are transmitted from optical end terminal 802 to optical end terminal 804 via optical communication channel 846.

Optical end terminal 804 receives these NRZ optical signals from optical end terminal 802 via optical communication channel 846. PD array 818 converts the NRZ optical signals into NRZ electrical signals and transmits the NRZ electrical signals to NRZ RX 824. NRZ RX 824 may function similar to receive circuit 500, and may output one or more received NRZ electrical signals to gearbox 822. Gearbox 822 converts these NRZ electrical signals to a corresponding number of PAM4 electrical signals and outputs these PAM4 electrical signals as a PAM4 electrical signal 838 and a PAM4 electrical signal 840. These PAM4 electrical signals may be output via an electrical interface unit (not shown in FIG. 8).

In one aspect, optical end terminal 804 receives a PAM4 electrical signal 842 and a PAM4 electrical signal 844 via an electrical interface unit (not depicted in FIG. 8). Gearbox 828 may convert these two PAM4 electrical signals into two pairs of NRZ electrical signals, and transmit these signals to NRZ TX 826. NRZ TX 826 may function similar to transmit circuit 600, and may output one or more conditioned NRZ electrical signals to VCSEL laser array 820 that converts the NRZ electrical signals to NRZ optical signals. These NRZ optical signals are transmitted from optical end terminal 804 to optical end terminal 802 via optical communication channel 848.

Optical end terminal 802 receives these NRZ optical signals from optical end terminal 804 via optical communication channel 848. PD array 816 converts the NRZ optical signals into electrical signals and transmits the NRZ electrical signals to NRZ RX 812. NRZ RX 812 may function similar to receive circuit 500, and may output one or more received NRZ electrical signals to gearbox 814. Gearbox 814 converts these NRZ electrical signals to a corresponding number of PAM4 electrical signals and outputs these PAM4 electrical signals as a PAM4 electrical signal 834 and a PAM4 electrical signal 836. These PAM4 electrical signals may be output via an electrical interface unit (not shown in FIG. 8).

In this way, a full-duplex optical communication link is implemented between optical end terminal 802 and optical end terminal 804 by active optical cable 800, communicating PAM4 signals by converting them into NRZ signals. By switching modes of gearboxes 806, 814, 824 and 828, active optical cable 800 can be configured to support NRZ signaling or PAM4 signaling modes. In one aspect, gearbox 806 and 814 may be combined into a single functional unit (gearbox), and gearbox 822 and 828 may be combined into a single functional unit (gearbox).

Active optical cable 800 can be implemented as a 100G SR2 AOC active cable including two end terminals connected by an optical fiber. In an aspect, each end terminal includes a gearbox, a NRZ transmitter, a VCSEL laser array, a NRZ receiver and a photodetector array. The VCSEL laser array and photodetector array are optical devices. Transceivers on both sides of the active optical cable provide the capabilities of photoelectric conversion, optical transmission and driving electrical ports, and the electrical ports of the active optical cable are PAM4 interfaces in a next-generation 100G DSFP or SFP-DD package. A 100G SR2 AOC active optical cable can be compatible with DSFP/SFP-DD packaging technology applied in the next generation data center, realizing two parallel 2×50 Gbps photo-electric transmission.

A traditional 100G QSFP28 AOC active optical cable is widely used in a 100G data center, which is composed of two optical transceivers and an optical fiber jumper. A traditional 100G QSFP28 AOC active optical cable uses a 4-channel 850 nm VCSEL laser array and a PD photodetector array. On the basis of 100G QSFP28 AOC, with the gearbox, a 100G SR2 AOC can be realized. The 100G SR2 AOC interface is SFP-DD or DSFP. The input of each transceiver is two channels of PAM4 differential pair signals TX1 and TX2, each channel is 50G, and the two channels constitute 100G. The output of each transceiver is two channels of PAM4 differential pair electrical signals RX1 and RX2, each channel is 50G, and the two channels constitute 100G.

This system can be expanded on the basis of the original 100G SR4 NRZ, and after adding the gearbox, 100G PAM4 can be obtained. In design, an NRZ transceiver can be reused to reduce the design iteration period. Traditional PAM4 reception is the bottleneck of a PAM4-based system, which requires high linearity of the receiver while also making it difficult to achieve high sensitivity. The receiving front-end of active optical cable 800 is NRZ, which requires less linearity and has a great advantage over PAM4 in sensitivity. A traditional PAM4 receiver needs a slicer to slice PAM4 signals into NRZ. Because the signal is small (i.e., of low amplitude) before slicing, the signal will be distorted greatly after slicing. This has a great impact on the sensitivity of the system. One aspect can provide better bit error rates (BERs) when using the NRZ mode as compared to the PAM4 mode.

Active optical cable 800 does not need to slice the signal because the input is an NRZ signal, and the system design complexity and system performance are greatly improved compared with traditional PAM4 signaling. In addition, because both the receiving front end and the transmitting back end are NRZ signals, the requirements for optical devices are reduced, which can result in cost savings.

Figure 9:
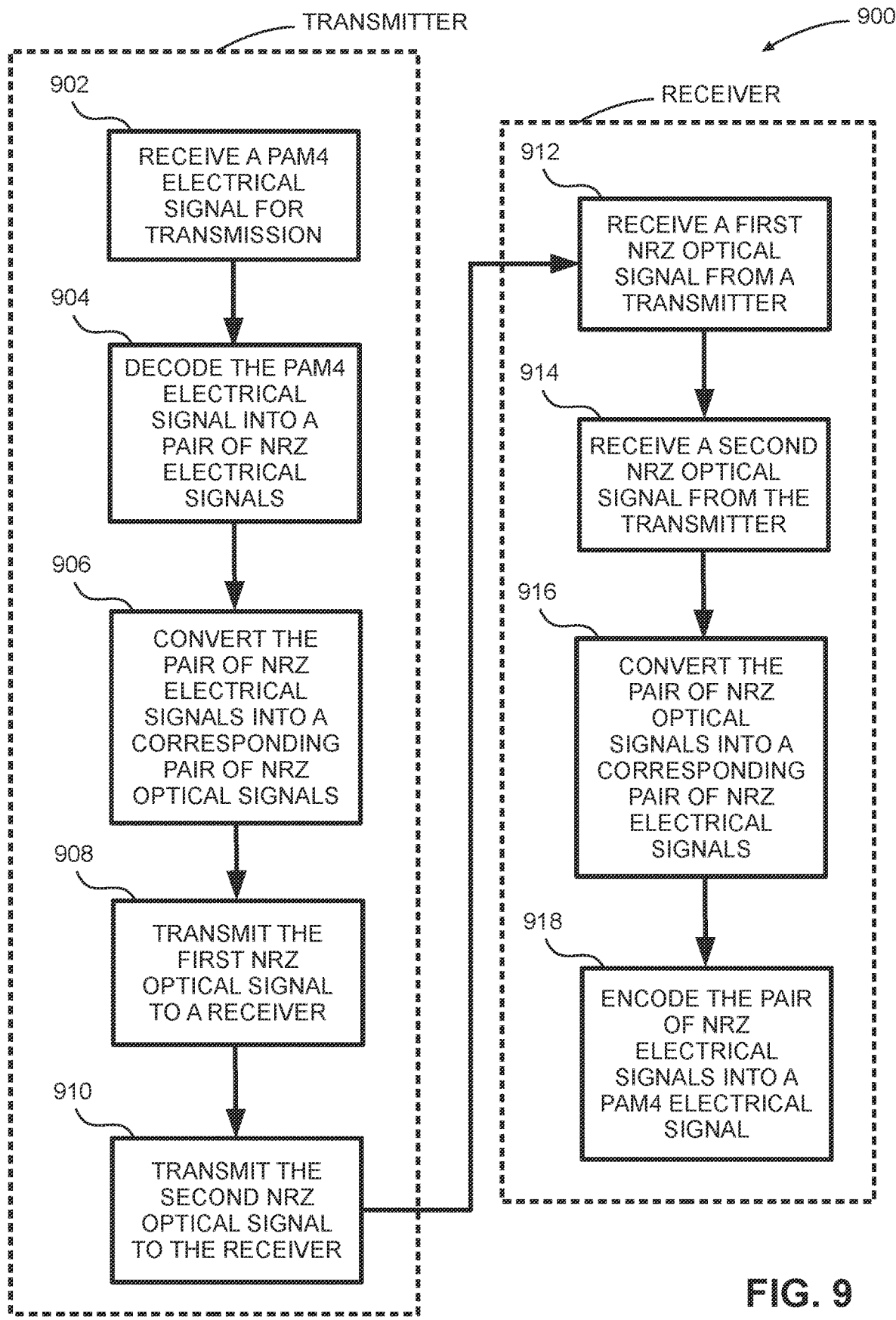
FIG. 9 is a flow diagram depicting an embodiment of a method to communicate using an active optical cable.

FIG. 9 is a flow diagram depicting an embodiment of a method 900 to communicate using an active optical cable. Method 900 may describe aspects of an operation of active optical cable 800 or optical fiber interconnection system 700.

Method 900 may include receiving a PAM4 electrical signal for transmission (902). For example, optical end terminal 802 can receive PAM4 electrical signal 830 for transmission. Or, optical transmitter 124 can receive PAM4 signal 102 for transmission.

Method 900 may include decoding the PAM4 electrical signal into a pair of NRZ electrical signals (904). For example, gearbox 806 may decode PAM4 electrical signal 830 into a pair of NRZ electrical signals. This process may be similar to PAM4 decoder 734 decoding PAM4 electrical signal 752 into a pair of NRZ electrical signals.

Method 900 may include converting the pair of NRZ electrical signals into a corresponding pair of NRZ optical signals (906). For example, transmit circuits 712 and 714 can individually convert each NRZ electrical signal generated by PAM4 decoder 734 into a pair of NRZ optical signals. In an aspect, this conversion is performed using circuits that include one or more VCSELs such as VCSEL 604.

Method 900 may include transmitting the first NRZ optical signal to a receiver (908), and transmitting the second NRZ optical signal to the receiver (910). For example, optical end terminal 802 can transmit a pair of NRZ optical signals to optical end terminal 804 via optical communication channel 846. Or, optical transmitter can transmit NRZ optical signals 118 and 120 over optical communication channel 122. In one aspect, 908 and 910 are performed in parallel, where the first and second NRZ optical signals are transmitted to the receiver simultaneously over the optical communication channel. This can be accomplished, for example, by transmitting each NRZ optical signal over a separate optical fiber included as a part of the optical communication channel.

Method 900 may include receiving a first NRZ optical signal from a transmitter (912), and receiving a second NRZ optical signal from a transmitter (914). For example, optical end terminal 804 can receive a pair of NRZ optical signals (i.e., a first NRZ optical signal and a second NRZ optical signal) from optical end terminal 802 via optical communication channel 846. Or, optical receiver 224 can receive NRZ optical signals 202 and 204 over optical communication channel 206. In one aspect, 912 and 914 are performed in parallel, where the first and second NRZ optical signals are received from the transmitter simultaneously over the optical communication channel.

Method 900 may include converting the pair of NRZ optical signals into a corresponding pair of NRZ electrical signals (916). For example, receive circuits 704 and 706 may each convert a received NRZ optical signal into a corresponding NRZ electrical signal, to generate a pair of NRZ electrical signals.

Method 900 may include encoding the pair of NRZ electrical signals into a PAM4 electrical signal. For example, PAM4 coding synthesis 722 may encode a received pair of NRZ electrical signals from receive circuits 704 and 706 into PAM4 electrical signal RX1 748.

In one aspect, 902 through 910 are performed by an optical transmitter (e.g., optical transmitter 124), while 912 through 918 are performed by an optical receiver (e.g., optical receiver 224).

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
receiving a pulse-amplitude modulated (PAM4) electrical signal at a transmitter for transmission to a receiver;
decoding the PAM4 electrical signal into a pair of non-return-to-zero (NRZ) electrical signals;
converting the pair of NRZ electrical signals into a corresponding pair of NRZ optical signals including a first NRZ optical signal and a second NRZ optical signal;
transmitting the first NRZ optical signal to a receiver over an optical communication channel; and
transmitting the second NRZ optical signal to the receiver over the optical communication channel, wherein the transmitter is configured to switch between a PAM4 signal transmission and an NRZ signal pair transmission.

2. The method of claim 1, wherein each conversion is performed by a vertical-cavity surface emitting-laser (VCSEL).

3. The method of claim 1, wherein the NRZ signal transmission supports a 100G NRZ signaling mode.

4. The method of claim 3, further comprising switching between enabling a clock/data recovery module for the NRZ signal pair transmission and bypassing the clock/data recovery module for the PAM4 signal transmission.

5. The method of claim 1, wherein a PAM4 electrical signal is a 50G PAM4 signal and an NRZ optical signal is a 25G NRZ signal.

6. The method of claim 1, further comprising performing a continuous-time linear equalization on the PAM4 signal prior to the decoding.

7. The method of claim 1, wherein the decoding is performed by a current mode logic (CML) circuit.

8. A method comprising:
receiving a first non-return to zero (NRZ) optical signal over an optical communication channel;
receiving a second NRZ optical signal over the optical communication channel;
converting a pair of NRZ optical signals comprising the first NRZ optical signal and the second NRZ optical signal into a corresponding pair of NRZ electrical signals; and
encoding the pair of NRZ electrical signals into a pulse-amplitude modulated (PAM4) electrical signal; and
switching between an NRZ signal pair reception mode and a PAM4 signal reception mode.

9. The method of claim 8, wherein each conversion is performed by a photodetector (PD).

10. The method of claim 8, wherein the NRZ signal reception supports a 100G NRZ signaling mode.

11. The method of claim 10, further comprising switching between enabling a clock/data recovery module for the NRZ signal pair reception and bypassing the clock/data recovery module for the PAM4 signal reception.

12. The method of claim 8, wherein a PAM4 electrical signal is a 50G PAM4 signal and an NRZ optical signal is a 25G NRZ signal.

13. The method of claim 8, wherein the encoding is performed by a current mode logic (CML) circuit.

14. An active optical cable comprising:
an electrical interface unit;
a gearbox; and
an optical transceiver, the electrical interface unit being configured to receive a first PAM4 electrical signal, the gearbox being configured to decode the first PAM4 electrical signal into a first pair of non-return-to-zero (NRZ) electrical signals, the optical transceiver being configured to:
convert the first pair of NRZ electrical signals into a corresponding first pair of NRZ optical signals including a first NRZ optical signal and a second NRZ optical signal;
transmit the first NRZ optical signal to a receiver over a first optical communication channel; and
transmit the second NRZ optical signal to the receiver over the first optical communication channel,
the optical transceiver being configured to:
receive a third NRZ optical signal over a second optical communication channel;
receive a fourth NRZ optical signal over the second optical communication channel; and
convert a second pair of NRZ optical signals comprising the third NRZ optical signal and the fourth NRZ optical signal into a corresponding second pair of NRZ electrical signals,
and
the gearbox being configured to encode the second pair of NRZ electrical signals into a second pulse-amplitude modulated (PAM4) electrical signal, wherein the active optical cable is configured to switch between a PAM4 signal transmission and an NRZ signal pair transmission.

15. The active optical cable of claim 14, wherein converting the first pair of NRZ electrical signals into the first pair of NRZ optical signals is performed by one or more vertical-cavity surface emitting-lasers (VCSELs).

16. The active optical cable of claim 14, wherein converting the second pair of NRZ optical signals into the second pair of NRZ electrical signals is performed by one or more photodetectors.

17. The active optical cable of claim 14, wherein the active optical cable supports a 100G NRZ signaling mode.

18. The active optical cable of claim 14, wherein the active optical cable is configured to switch between a PAM4 signal reception and an NRZ signal pair reception.

19. The active optical cable of claim 14, wherein a PAM4 electrical signal is a 50G PAM4 signal and an NRZ optical signal is a 25G NRZ signal.

20. The active optical cable of claim 14, further comprising performing a continuous-time linear equalization on the PAM4 signal prior to the decoding.

21. The active optical cable of claim 14, wherein the decoding is performed by a current mode logic (CIVIL) circuit.

* * * * *